Sept. 1, 1964          D. J. NEWMAN                3,147,377
THERMOGRAPHIC PRODUCTION OF COLOR-PROJECTING TRANSPARENCIES
             AND SHEET MATERIALS USEFUL THEREIN
                    Filed May 25, 1960

INVENTOR
DONALD J. NEWMAN by Carpenter, Abbott, Coulter + Kinney
ATTORNEYS

United States Patent Office

3,147,377
Patented Sept. 1, 1964

---

3,147,377
THERMOGRAPHIC PRODUCTION OF COLOR-PROJECTING TRANSPARENCIES AND SHEET MATERIALS USEFUL THEREIN
Donald J. Newman, White Bear Lake, Minn., assignor to Minnesota Mining & Manufacturing Company, St. Paul, Minn., a corporation of Delaware
Filed May 25, 1960, Ser. No. 31,580
4 Claims. (Cl. 250—65)

This invention relates to the preparation of projection transparencies from graphic originals such as printed or typewritten books or documents. More specifically, the invention is concerned with novel copy-sheet material and with methods for making positive projection transparencies from differentially radiation-absorptive graphic originals with such material by direct thermographic copying procedures.

It is frequently found desirable to project light-images of printed matter, sketches or drawings, tabulated data or other graphic material or viewing-screens as visual aids. Lecturers or instructors commonly employ "overhead projectors" for these purposes. The required projection transparencies may be prepared by printing or writing on suitable transparent film or other sheet material. Copies of printed pages of books, tabulated data, or other graphic originals may be prepared in the form of positive projection transparencies by photographic means, the preparation of microfilm positives being one example.

The present invention provides further and much simplified means and procedures for the preparation of positive projection transparencies from graphic originals. The transparencies are produced as full-size copies of the originals suitable for use in the "Vu-Graph" or other commercially available overhead projectors. They may be written upon with suitable pencils during projection, and permit the lecturer to mark or point to portions of the copy while standing at the projector. The transparencies may be prepared directly from the originals and placed immediately on the projector without any intermediate chemical processing and within a few seconds. Portions of the original may be reproduced in contrasting colors if desired, as to add emphasis to specific paragraphs or sections. The materials employed may be stored indefinitely without deterioration, and are immediately available when required.

Suitable procedures and equipment for preparing positive projection transparencies with the copy-sheet materials of the invention have previously been described, for example in Kuhrmeyer et al. U.S. Patent No. 2,891,165. The process involves brief intense irradiation of the printed surface of the original, and utilization of the resulting differential heat-pattern to provide the desired visible change, in this instance the reproduction of the printed image as a colored image on a transparent film backing or copy-sheet. In front-printing, the radiation is directed to the printed surface through the radiation-transmissive copy-sheet in contact therewith. In back-printing, the copy-sheet is placed in contact with the reverse side of the thin original and the printed side is then directly irradiated.

It has now been found that dyestuffs may be preferentially transferred from one plastic film to another by simply briefly locally heating the two films while in mutual contact. Thus the heating effect provided at the preferentially radiation-absorbent areas of the original in the thermographic copying process may be utilized in transferring dye from a source sheet to a transparent receptor sheet at corresponding areas, producing a reproduction of the original in the form of colored image areas on a transparent background. Under appropriate conditions the source sheet simultaneously is converted to a negative projection transparency, having transparent image areas on a colored background, and is thus useful not only for image projection but for contact printing on light-sensitive photographic and other print-papers, lithographic plates, etc.

Typical structure and procedure are schematically illustrated in the accompanying drawing, in which.

Figure 1:
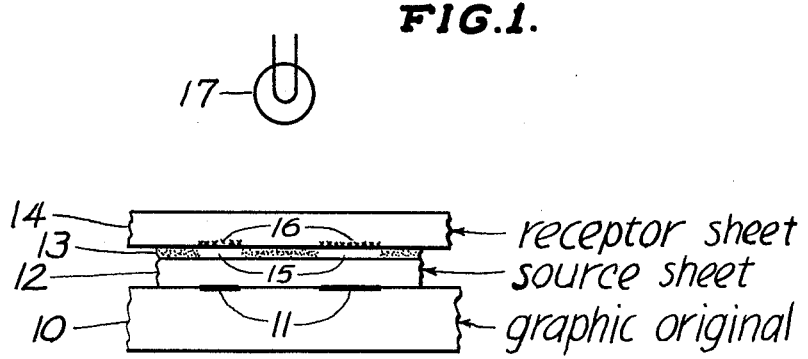
FIGURE 1 is a schematic representation showing the thermographic copying of a graphic original on a receptor sheet and employing an intermediate source sheet.

In FIGURE 1, the graphic original 10 is placed with its printed surface, having radiation-absorptive inked areas 11, in contact with a source sheet 12 coated on its opposite surface with a thin layer 13 comprising a dye and a binder. A receptor sheet 14 is placed over the source sheet, and the composite is briefly intensely irradiated with radiation from a source 17. The resulting heat-pattern causes transfer of dye from areas 15 of the layer 13 to corresponding areas 16 of the receptor sheet. On the overhead projector, light projected through the receptor sheet 14 produces on the viewing screen a colored likeness of the original image areas 11, whereas light projected through the source sheet 12 produces a white image on a colored background.

Figure 2:
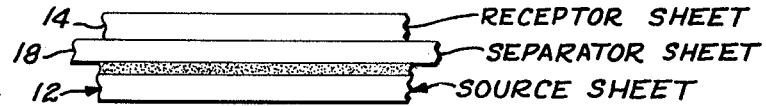
FIGURE 2 represents a receptor sheet and source sheet separated by a removable dye-resistant separator sheet.

As indicated in FIGURE 2, the source sheet 12 and receptor sheet 14 are conveniently supplied as a composite with an intermediate removable separator sheet 18 for maintaining the two out of mutual contact during storage.

Figure 3:
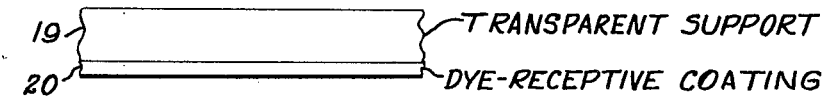
FIGURE 3 represents an alternative form of receptor sheet.

An alternative receptor sheet structure, shown in FIGURE 3, consists of a thin transparent support film 19 carrying on one surface a dye-receptive coating 20.

The following specific examples will serve further to illustrate but not to limit the invention.

*Example 1*

A source sheet is prepared by applying a visibly uniform coating of Calco Oil Blue ZA oil-soluble blue dye in powder form to the microscopically rough surface of matte finish thin cellulose acetate film by hand rubbing with a powder-puff type applicator, and then fusing the surface of the film by brief heating. The dye is bonded within the surface crevices of the film and cannot be removed by rubbing.

A plasticized vinyl receptor film is placed in contact with the dye-containing surface of the source film and the two are placed over a graphic original, in this case typewritten on white letterhead paper. The composite is passed through the "Secretary" heat-copying machine of Patent No. 2,891,165. The receptor sheet is converted to a positive projection transparency.

The specific vinyl film employed as the receptor sheet in this example is a transparent smooth-surface film two mils thick, made up of three parts of a copolymer of about 97% vinyl chloride and about 3% vinyl acetate, and one part of dioctyl phthalate plasticizer, and is commercially available at the date of this application as VBA–9925 vinyl film.

*Example 2*

A number of source films are prepared in different colors by coating solutions of dye and binder on 1-mil oriented Mylar polyethylene terephthalate film and removing the solvent by evaporation. In each case toluene is used as the solvent and Ethocel N–100 ethyl cellulose is used as the binder. The specific dye or dyes, the weight ratio of binder to dye, and the coating weight in grams per square yard after drying are as follows:

| Color | Dye | Proportions | | | | Ctg. Wt. |
|---|---|---|---|---|---|---|
| | | Binder | Dye 1 | Dye 2 | Solvent | |
| Blue | "Calco Oil Blue" | 3 | 1 | | 36 | 0.63 |
| Red | "Calco Oil Red" | 2 | 1 | | 38 | 0.77 |
| Orange | "Calco Oil Scarlet" | 3 | 1 | | 36 | 0.85 |
| Brown | {"Calco Oil Scarlet" / "Calco Oil Blue"} | 3 | .6 | .4 | 36 | 0.67 |
| Green | {"Calco Oil Blue" / "duPont Oil YellowN"} | 3 | .8 | .2 | 36 | 0.99 |

The source sheets produce images of the indicated color on VBA–9925 vinyl receptor film in the thermographic copying process; the color density and contrast are substantially identical in all cases. The color is substantially entirely removed from the source sheet at the image area, without removing the ethyl cellulose binder film which remains affixed to the polyester film base. High quality projections are obtained with both the receptor sheet and the source sheet transparencies on the "Vu-Graph" overhead projector. Useful source sheets are also made with coatings of ethyl cellulose and toluene containing one or more of the following dyes: "Calco Oil Blue ZA," "Calco Oil Red N–1700," "Calco Oil Orange Z–7078," "Calco Oil Scarlet ZBL," "Calco Oil Red ZD," and "Calco Chinoline Yellow ZSS."

*Example 3*

One mil oriented Mylar polyester film is coated with solutions of various dyes using toluene as the solvent and Pliolite VT vinyltoluene polymer as binder in a formula containing, by weight, 0.5 part binder, 1.5 parts of dye, and 34 parts of toluene. The solutions are applied by means of a knife or bar coater set at an orifice of 1 mil, and the solvent is evaporated at moderately elevated temperature. In each instance the coated film serves as an effective source sheet for transfer of dye at image areas by thermographic copying procedures to VBA–9925 vinyl film receptors to provide high quality positive and negative projector transparencies.

The specific dyes employed include "Sudan Green 4B," "Sudan Blue BR," "Cibacit Red 3B," "Oracet Red B," "Oracet Red 2G," "Plasto Orange RS," "Du Pont Oil Yellow N," "Du Pont Oil Orange," "DuPont Victoria Blue Base," "Du Pont Oil Blue A," "Du Pont Victoria Green Base," and "Oracet Blue B."

*Example 4*

Portions of the red source sheet of Example 2 are placed in contact with each of a number of different receptor films and the composite in each case is combined with a graphic original in front-print position and irradiated in the "Secretary" heat-copying machine, with results as follows:

Receptor sheet:                 Results
    Paper _____ No image.
    VBA–3300 unplasticized
        vinyl film _____ Very faint image.
    VBA–9020 vinyl film, 20%
        DOP plasticizer _____ Good image.
    VBA–9925 vinyl film, 25%
        DOP plasticizer _____ Excellent image.
    VBA–9930 vinyl film, 30%
        DOP plasticizer _____ Excessive backgrounding.

The vinyl film in each case is prepared from a copolymer of about 97% vinyl chloride and about 3% vinyl acetate, and is 2 mils thick.

*Example 5*

A source sheet is prepared by coating Mylar polyester film with a solution in toluene of 65 parts "Calco Oil Blue" dye, 130 parts of ethyl cellulose binder, and 43 parts of triphenyl phosphate plasticizer. It is used in conjunction with a VBA–3300 unplasticized vinyl film receptor in successfully preparing positive and negative projection transparencies from graphic originals by the thermographic copying process using the "Secretary" copying machine. The same source sheet in combination with non-oriented "Luvitherm" unplasticized transparent polyvinyl chloride film or with similar film in highly oriented heat-contractile form provides equally effective transparencies. The use of uniformly highly biaxially oriented unplasticized film receptor sheets makes possible the subsequent miniaturization of the transparency by processes involving the uniform heating of the heat-contractile film.

The same dye, binder and plasticizer components are equally effectively applied to the film base using either ethyl alcohol or acetone as the volatile vehicle. For example, two parts of Ethocel N–100 ethyl cellulose, one part of "Calco Oil Red N–1700," and one part of tricresyl phosphate are well mixed by prolonged grinding in a ball mill, and the mixture coated on a base film and dried. The resulting source sheets are fully equivalent to those prepared with toluene as the volatile vehicle.

"Pliofilm 80–N–2" rubber hydrochloride film, and "Saran" vinyl chloride-vinylidine chloride copolymer film are additional examples of polymeric films which, like the VBA–3300 and the Luvitherm vinyl films, are useful as receptor films in conjunction with the source sheets of this example. Each of these receptor sheet polymers contains chlorine in the molecule, whereas the binders employed in the source sheet coatings are free of chlorine.

The plasticized source sheets are useful also with plasticized receptor sheets.

*Example 6*

Source sheets as provided in Examples 2 and 3 are employed effectively in conjunction with a receptor sheet prepared by coating Mylar polyester film with a thin layer of a mixture of one part of dioctyl phthalate and three parts of a copolymer of 95 parts vinyl chloride and 5 parts vinyl acetate, applied from solution in a volatile solvent and dried at elevated temperature. The polyester film alone is not an effective receptor sheet. The use of oriented polyester film which has not been heat-set permits subsequent miniaturization of the transparency, a result not possible with VBA–9925 and similar plasticized vinyl film receptors.

*Example 7*

A receptor sheet is prepared by coating Mylar polyester film with a thin layer of a mixture of two parts of Aroclor 5442 chlorinated diphenyl and one part of Ethocel N–200 ethyl cellulose applied from solution in a volatile liquid solvent and dried in warm air.

A source sheet is separately prepared as described in Example 3 using Pliolite S–7 polystyrene resin as the binder and "Calco Red N–1700" as the dye.

The composite copy-sheet employing these receptor and source sheets produces high quality positive and negative projection transparencies from graphic originals by thermographic copying procedures.

Omitting the chlorinated diphenyl from the receptor sheet coating destroys its effectiveness as a receptor sheet.

*Example 8*

Two mil transparent polyvinyl alcohol film is used as a receptor sheet in conjunction with a source sheet consisting of Mylar polyester film coated with the dried residue of a three mil layer of a solution of 0.2 part of methylene blue hydrochloride and 1 part of Ethocel N–22 ethyl cellulose in 9 parts of isopropanol. The receptor film is held for a few seconds in a cloud of steam just prior to being placed in contact with the source sheet and subjected to the thermographic copying process. A blue image is obtained on the receptor sheet, with which a faint image may be projected on the viewing screen.

Improved image formation is provided by addition of small amounts of glycerine to the receptor film.

In the foregoing examples it may be observed that the transfer of dye from source sheet to receptor sheet is greatly improved by the incorporation, in one or the other or both sheets, of a plasticizer material in which the dye is soluble. Inherently soft or highly thermoplastic films require less plasticizer than harder or more heat-resistant films, and in some instances are shown to be capable of accepting useful amounts of the dye in the absence of plasticizers. For the most part, however, it is found desirable to include significant proportions of plasticizer in the copy-sheet composite.

As shown by the examples, the ratio of dye to binder in the source sheet coatings may be varied considerably, and such variation is useful in balancing the image densities obtained with different dyes. Since the transfer of dye is necessarily largely confined to the portion immediately adjacent the surface, the thickness of the dye coating is important where negative as well as positive transparencies are desired. In general, it is preferred to apply the dye coatings in thicknesses not greater than about one-tenth mil and at dye-to-binder ratios at least as high as about one part of dye to five parts of binder, or preferably one of dye to two or three of binder.

Although both the source sheets and the receptor sheets by themselves are entirely stable, they must be kept from prolonged mutual contact in order to avoid slow migration of dye from the former to the latter. The sheets may conveniently be combined with a removable slip-sheet between them, the latter being removed just prior to the copying operation; the structure is somewhat similar to the well-known composite of manifold invoice or sales slips with interleaved carbon paper. More conveniently, the source sheets and receptor sheets are separately boxed, or the films wound in roll form, and placed together only as needed.

Although the exact mechanism by which the dye is preferentially transferred from source sheet to receptor sheet is not known with certainty, it is suggested that the dye may act as a direct dye for the binder of the source sheet but as a substantive dye for the dye-receptive polymer of the receptor sheet, and that localized heating, particularly in the presence of a migrant plasticizer, then permits the dye to be preferentially taken up by the latter polymer. The theory is consistent with the results obtained on dipping strips of VBA-9925 vinyl polymer film in solutions of dyes such as Calco Oil Red in toluene; the film is permanently colored, and the color cannot be removed by rinsing with toluene. No such action occurs on cellulose acetate film, which is rendered completely colorless by rinsing. Also the dyed image areas produced in the thermographic copying process, for example as described in connection with Example 2, are not removed by intensive rinsing with toluene. But regardless of theory, there is provided means and methods for rapidly making positive and negative projection transparencies in any desired color or combination of colors from graphic originals without any chemical processing and by direct thermographic copying procedures.

What is claimed is as follows:

1. Method of making permanent projection transparency reproductions of a differentially radiation-absorptive graphic original and capable of projecting a colored image comprising briefly intensely irradiating said original while in heat-conductive contact with a heat-sensitive copy-sheet composite including a transparent thin dye-receptive receptor film and a dye-containing source sheet in mutually face-to-face contact and to an extent sufficient to cause dyeing of said receptor film at areas corresponding to radiation-absorptive image-forming areas of said original, at least one of said film and said sheet containing a plasticizer material which is a solvent for said dye; and separating said receptor film and said source sheet.

2. Method of making permanent projection transparency reproductions of a differentially radiation-absorptive graphic original and capable of projecting a colored image comprising: briefly intensely irradating said original to form a heat-pattern while in heat-conductive contact with a heat-sensitive copy-sheet composite including in mutually face-to-face contact a transparent thin dye-receptive receptor film and a source sheet having at said face a coating of a dye and a binder, said binder being non-substantive toward said dye, at least one of said film and said coating containing a plasticizer material which is a solvent for said dye, said heat-pattern being of sufficient intensity to cause dyeing of said receptor film; and separating said receptor film and said source sheet.

3. Method of making a permanent projection transparency having clear colored image areas for projecting bright colored images, comprising placing in mutually face-to-face contact a graphic original of which a transparency is to be made, a source sheet having a uniform coating of a dye, and a transparent receptor film having a coating of a plasticized binder, the plasticizer being a solvent for said dye; locally heating said sheet and film at image areas of said graphic original to cause solution of said dye in said plasticizer at said areas; and separating said sheet and film.

4. A heat-sensitive copy-sheet composite, including in order a receptor sheet, a removable dye-resistant separator sheet, and a source sheet, said source sheet comprising a thin transparent base film having a continuous uniform face coating comprising a dye and a polymeric binder non-receptive of said dye, said receptor sheet comprising a thin transparent polymeric film receptive of said dye, at least one of said coating and said receptor film including as a minor component a plasticizer in which said dye is soluble, said receptor sheet and source sheet being so disposed as to come into mutually face-to-face contact on removal of said separator sheet, said composite of receptor sheet, separator sheet and source sheet being capable of prolonged storage without transfer of dye from said source sheet, said receptor sheet and source sheet when in mutually face-to-face contact being suitable for simultaneously preparing positive and negative transparencies, capable of projecting colored images, from differentially radiation-absorptive graphic originals by thermographic copying processes.

References Cited in the file of this patent

UNITED STATES PATENTS

| | | |
|---|---|---|
| 2,699,113 | Hoover | Jan. 11, 1955 |
| 2,721,821 | Hoover | Oct. 25, 1955 |
| 2,769,391 | Roshkind | Nov. 6, 1956 |
| 2,868,124 | Crawford | Jan. 13, 1959 |
| 2,893,890 | Harvey | July 7, 1959 |
| 2,916,622 | Nieset | Dec. 18, 1959 |
| 2,940,866 | Sprague | June 14, 1960 |
| 2,944,037 | Clark | July 5, 1960 |
| 2,954,311 | Vander Weel | Sept. 27, 1960 |
| 3,002,858 | Newman et al. | Oct. 3, 1961 |
| 3,054,692 | Newman et al. | Sept. 18, 1962 |
| 3,083,132 | Miehle | Mar. 26, 1963 |